Sept. 9, 1924.
H. F. MILLER
SHEARS
Filed Sept. 17, 1923
1,507,614
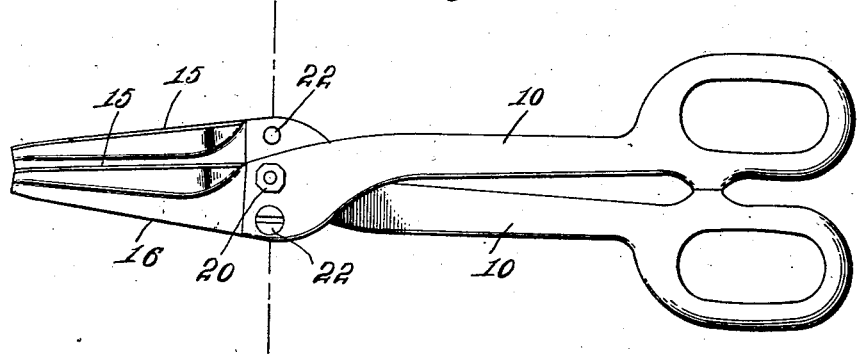
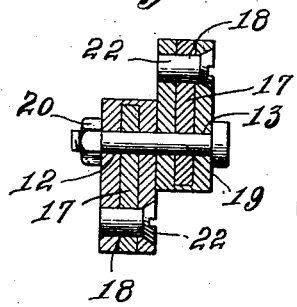
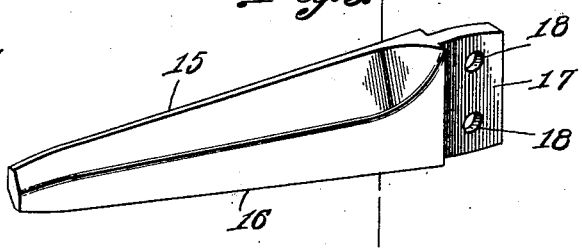
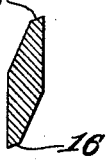
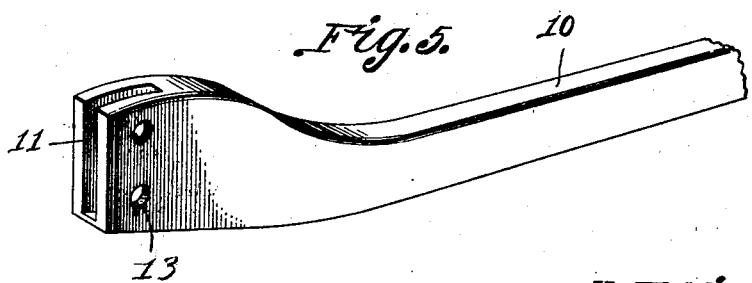
H. F. Miller
INVENTOR
BY Victor J. Evans
ATTORNEY
WITNESS:

Patented Sept. 9, 1924.

1,507,614

UNITED STATES PATENT OFFICE.

HENRY F. MILLER, OF WAYNESVILLE, NORTH CAROLINA.

SHEARS.

Application filed September 17, 1923. Serial No. 663,248.

*To all whom it may concern:*

Be it known that I, HENRY F. MILLER, a citizen of the United States, residing at Waynesville, in the county of Haywood and State of North Carolina, have invented new and useful Improvements in Shears, of which the following is a specification.

This invention relates to cutting implements and has particular application to shears wherein the cutting blades are provided with duplex cutting edges and associated with the handle of the shears in a manner to permit the blades to be quickly and conveniently reversed to present a pair of new cutting edges for use as the occasion may require.

The nature and advantages of the invention will be better understood when the following detailed description is read in connection with the accompanying drawing, the invention residing in the construction, combination and arrangement of parts as claimed.

In the drawing forming part of this application, like numerals of reference indicate similar parts in the several views, and wherein:

Figure 1 is a view in elevation of a pair of shears constructed in accordance with the present invention.

Figure 2 is a sectional view taken on the line 2—2 of Figure 1.

Figure 3 is a detail view of one of the cutting blades.

Figure 4 is a sectional view taken on the line 4—4 of Figure 3.

Figure 5 is a fragmentary view of one of the handles of said shears.

Referring to the drawing in detail, 10 indicates a pair of crossed pivoted handles of the general configuration used in cutting devices of the class in question, these handles being pivoted as at 11 adjacent the extreme forward ends thereof. It will be noted that each end of each handle 10 is formed with a transverse groove 11, and with spaced openings 12 and 13 respectively which traverse the groove as illustrated.

Each handle is associated with a cutting blade of the construction illustrated in Figures 3 and 4 wherein it will be noted that each blade has its opposed edges bevelled and sharpened to provide cutting edges 15 and 16 respectively. In other words each blade is preferably of the cross sectional contour as shown in Figure 4, and is further formed at one end with a tongue 17 adapted to be received by the transverse groove in one of the handles 10. This tongue is provided with spaced openings 18 adapted to register with the openings 12 and 13 of the particular handle with which the jaws are associated. The pivot 19 for the handles 10 is passed through the aligned openings of the adjacent handles when the latter are crossed as shown, and are incidently also passed through the aligned openings in the tongues of the respective cutting blades, this pivot having associated therewith a nut 20 so that the pivot can be easily removed and the handles separated when the occasion requires. Passed through the other opening of each handle and through the aligned opening in the tongue of the associated jaw is a screw 22, which of course serves to hold the jaw fixed relative to its particular handle. The construction is such that when the cutting edges 15 of the respective jaws become dull beyond further use, or to the extent that they are rendered inefficient for the purpose intended, the said cutting blades can be removed from the respective handles and reversed to arrange the cutting edges 16 of the said jaws in confronting operative relation thus providing the tool with new cutting edges, which allows the tool to be used an appreciable length of time before it is necessary to sharpen the blades. It is manifest that the cutting blades can be quickly separated from the handles when it is necessary to reverse the blades by simply removing the pivot and the screws above mentioned which are utilized to hold the parts fixed relatively while the tool is in use.

While it is believed that from the foregoing description, the nature and advantages of the invention will be readily apparent, I desire to have it understood that I do not limit myself to what is herein shown and described and that such changes may be resorted to when desired as fall within the scope of what is claimed.

Having thus described the invention, I claim:

1. A cutting tool of the character described comprising a pair of crossed pivoted handles, the free end of each handle having a transverse groove, a cutting blade for each handle having a tongue adapted to be fitted in said groove, means for securing the blade to its respective handle, and said blade having its opposed edges sharpened to provide duplex cutting edges, whereby the blades can be reversed as and for the purpose specified.

2. A cutting tool of the character described comprising a pair of crossed handles, each having a transverse groove at one end thereof, a cutting blade for each handle, said blade having its opposed edges sharpened to provide duplex cutting edges, a tongue projecting from one end of each blade and adapted to be received by said groove of the particular handle, each handle having spaced openings traversing said groove, each tongue having spaced openings adapted to align with the openings of its particular handle, the pivot for said handles being passed through all of the aligned openings of the respective handles when the latter are crossed, and means passed through the other openings of the respective handles and blades for holding the parts fixed relatively, said blades being reversed to present new cutting edges for use as described.

In testimony whereof I affix my signature.

HENRY F. MILLER.